US007961895B2

(12) United States Patent
Wu et al.

(10) Patent No.: US 7,961,895 B2
(45) Date of Patent: Jun. 14, 2011

(54) AUDIO INTERFACE DEVICE AND METHOD

(75) Inventors: Li-Te Wu, Taipei (TW); Wei-Chan Hsu, Cupertino, CA (US)

(73) Assignee: Fortemedia, Inc., Cupertino, CA (US)

( * ) Notice: Subject to any disclaimer, the term of this patent is extended or adjusted under 35 U.S.C. 154(b) by 1064 days.

(21) Appl. No.: 11/748,519

(22) Filed: May 15, 2007

(65) Prior Publication Data

US 2008/0285776 A1 Nov. 20, 2008

(51) Int. Cl.
*H04B 3/00* (2006.01)

(52) U.S. Cl. .............. 381/81; 381/77; 381/85; 381/123; 381/122; 381/113

(58) Field of Classification Search .................... 381/77, 381/79–81, 123, 111, 113–114, 84–85, 122; 700/94

See application file for complete search history.

(56) References Cited

U.S. PATENT DOCUMENTS 7,187,775 B2 * 3/2007 Fujita ............................ 381/111
2004/0156520 A1 * 8/2004 Poulsen et al. ................ 381/369
2004/0160993 A1 8/2004 Ganton et al.
2004/0175993 A1 9/2004 Chennakeshu
2006/0215856 A1 * 9/2006 Meyer et al. .................. 381/113
2007/0104332 A1 5/2007 Clemens et al.

OTHER PUBLICATIONS

PCT International Search Report, Apr. 4, 2008.

* cited by examiner

*Primary Examiner* — Devona E Faulk
*Assistant Examiner* — Disler Paul
(74) *Attorney, Agent, or Firm* — Thomas|Kayden

(57) ABSTRACT

The invention provides an audio interface device and method to acquire audio signal from either an analog or digital microphone through a common connector. The audio interface comprises a connector, electrically connected with a microphone plugged thereinto, an analog readout circuit, acquiring an analog audio signal from an analog microphone, a digital readout circuit, acquiring a digital audio signal from a digital microphone, and a decision circuit, selectively connecting the analog or digital readout circuit to the connector to acquire the analog or digital audio signal respectively according to whether the microphone plugged into the connector is analog or digital.

8 Claims, 3 Drawing Sheets

AUDIO INTERFACE DEVICE AND METHOD

BACKGROUND OF THE INVENTION

1. Field of the Invention

The invention relates to audio interface, and in particular to an audio interface device and method acquiring audio signals from either an analog or digital microphone through a common connector.

2. Description of the Related Art

An analog microphone has a 3-wire audio plug, requiring a 3-contact audio jack connector, and a digital microphone generally has a 4-wire audio plug, requiring a 4-contact audio jack connector. Conventionally, both the 3-contact audio jack connector and the 4-contact audio jack connector are simultaneously provided to an electronic system to satisfy different users who may use the analog microphone or the digital microphone. Such configuration of audio jack connectors inevitably increases dimensions and production costs of the electronic system.

Accordingly, it is desirable to propose an audio interface for an electronic system to reduce dimensions and production costs of the electronic system, the audio interface acquiring an analog or digital audio signal of an analog or digital microphone through a single common connector.

BRIEF SUMMARY OF INVENTION

One exemplary embodiment of the invention is directed to an audio interface which comprises a connector, electrically connected with a microphone plugged therein; an analog readout circuit, acquiring an analog audio signal from an analog microphone; a digital readout circuit, acquiring a digital audio signal from a digital microphone; and a decision circuit, selectively connecting the analog or digital readout circuit to the connector to acquire the analog or digital audio signal respectively according to whether the microphone plugged into the connector is analog or digital.

The decision circuit may comprise a detection unit, detecting if a microphone plugged into the connector is analog or digital; and a switching unit, connecting either the analog readout circuit or the digital readout circuit to the connector according to the detection unit. In this exemplary embodiment, the connector is an audio jack connector with a tip contact, a ring contact, and first and second sleeve contacts, corresponding to a plug configuration of the digital microphone; wherein one of the first and second sleeve contacts is connected to a reference ground, and the other one receives the digital audio signal from the digital microphone plugged into the connector.

In addition, the detection unit controls the switching unit to connect the digital readout circuit to the connector such that the digital readout circuit sends an active voltage and a clock signal to the digital microphone through the tip and ring contacts of the connector, whereby the detection unit detects that the microphone plugged into the connector is digital when a data signal from the microphone plugged into the connector appears at the first or second sleeve contact not connected to the reference ground, otherwise determining that the microphone plugged into the connector is analog.

Another exemplary embodiment is directed to an audio interface method comprising the steps of providing a common connector electrically connected with a microphone plugged therein, providing a digital readout circuit to acquire a digital audio signal from a digital microphone, providing an analog readout circuit to acquire an analog audio signal from an analog microphone, detecting the type of microphone plugged into the common connector, and connecting either the analog or digital readout circuit to the common connector to acquire either the analog or digital audio signal according to the microphone type of the microphone plugged in the connector. Therefore, the digital or analog signal from the digital or analog microphone can be acquired merely through the common connector.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
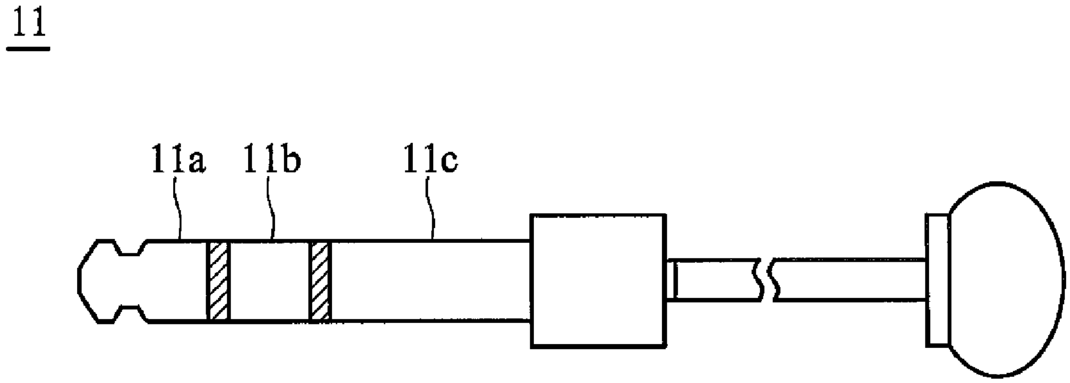
FIG. 1A ( PRIOR ART )
FIGS. 1A and 1B are block diagrams of a conventional analog microphone and a digital microphone.
Figure 1B:
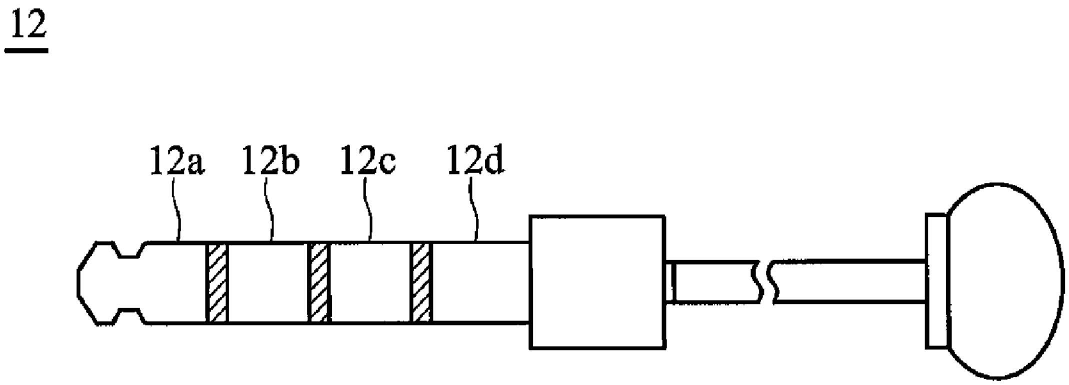
FIG. 1B ( PRIOR ART )

FIGS. 1A and 1B are block diagrams of a conventional analog microphone 11 and a digital microphone 12. In FIG. 1A, the plug of the analog microphone 11 has a tip portion 11*a*, ring portion 11*b* and a sleeve portion 11*c*. The sleeve portion 11*c* usually is supposed to be connected to a ground reference, the ring portion 11*b* to the right channel for a stereo signal generated by the analog microphone 11 and the tip portion 11*a* to the left channel for the stereo signal generated by the analog microphone 11. In FIG. 1B, the plug of the digital microphone 12 also has a tip portion 12*a* and a ring portion 12*b*, but also comprises a first sleeve portion 12*c* and a second sleeve portion 12*d*. In FIG. 1B, the first sleeve portion 12*c* (or the second sleeve portion 12*d*) usually is supposed to be connected to a ground reference, the tip portion 12*a* must be biased by a voltage source and the ring portion 12*b* also fed by a clock signal, such that the second sleeve portion 12*d* (or the first sleeve portion 12*c*) outputs digital audio data generated by the digital microphone 12.

Figure 2:
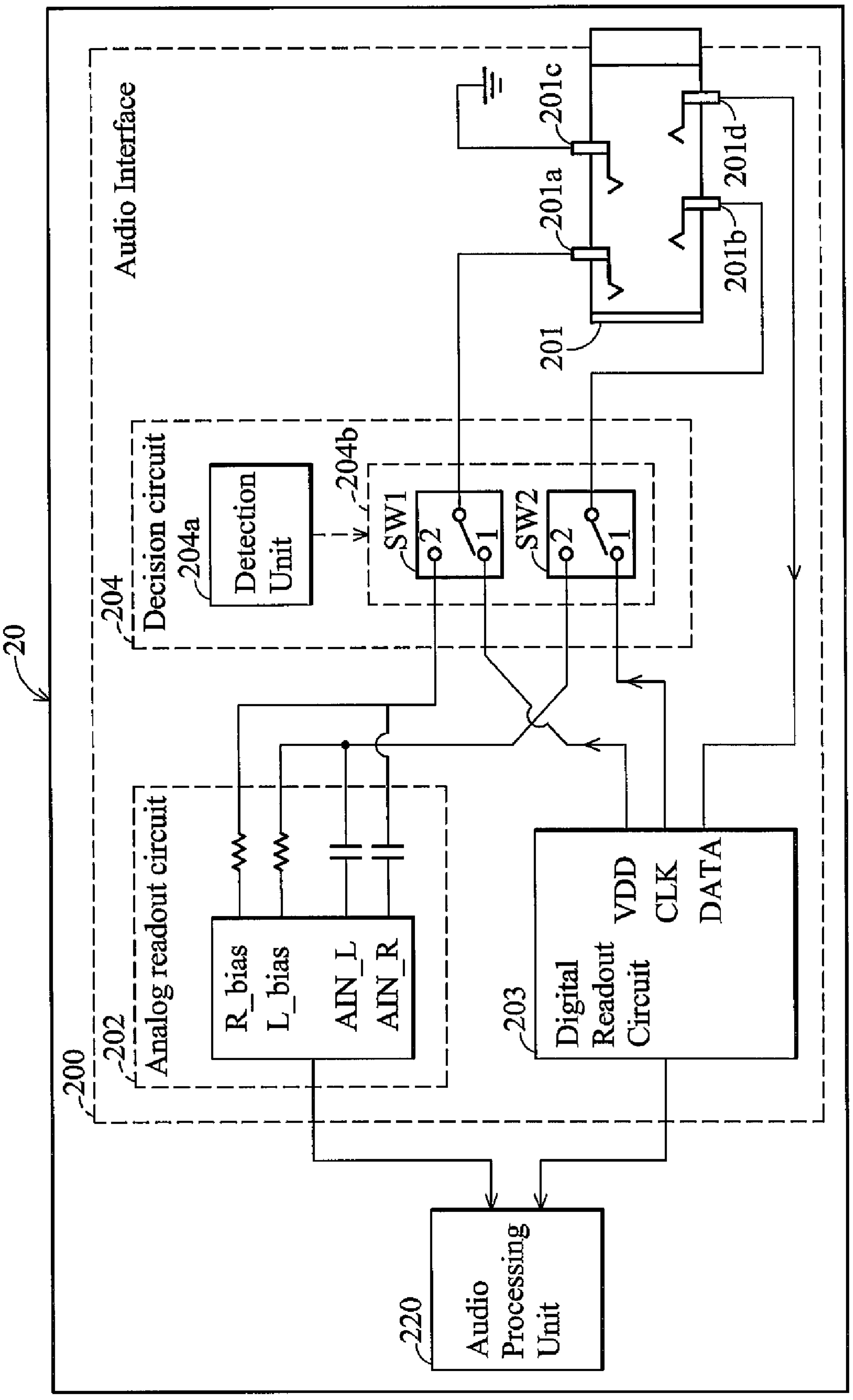
FIG. 2 is a block diagram of an electronic system having an audio interface according to an exemplary embodiment of the invention.

FIG. 2 is a block diagram of an electronic system 20 having an audio interface 200 according to an exemplary embodiment of the invention. The electronic system 20 may be a portable electronic device such as mobile phone, notebook computer, smart phone, or the like, but is not limited thereto. The audio interface 20 comprises a connector 201, an analog readout circuit 202, a digital readout circuit 203 and a decision circuit 204.

The connector 201 electrically connects to a microphone (not shown in FIG. 2) plugged thereinto. In this embodiment, the connector 201 is an audio jack connector with a tip contact 201*a*, a ring contact 202*b*, a first sleeve contact 201*c* and a second sleeve contact 201*d*, corresponding to the plug configuration of the digital microphone depicted in FIG. 1B. One of the first and second sleeve contacts 201*c* and 201*d* may be connected to a reference ground in the electronic system 20. Here only as an example, the first sleeve contact 201*c* is connected to the ground reference.

The analog readout circuit 202 operates to acquire an analog audio signal if when an analog microphone is plugged into the connector 201. The digital readout circuit 203 operates to acquire a digital audio signal if a digital microphone is plugged into the connector 201.

The decision circuit 204 selectively connects the analog or digital readout circuit (202 or 203) to the connector 201 to acquire the analog or digital audio signal respectively according to whether the microphone plugged in the connector is the analog or digital microphone.

In FIG. 2, the decision circuit 204 comprises a detection unit 204*a* to detect the type (analog or digital) of the microphone plugged into the connector; and a switching unit 204*b* to connect either the analog readout circuit 202 or the digital readout circuit 203 to the connector 201 according to detection of the detection unit 204*a*. The switching unit 204*b* may be implemented by two switches (SW1, SW2) control by the detection circuit 204*a*, or by a multiplexer (not shown in FIG. 2).

The detection unit 204 controls the switching unit 204*b* to connect VDD output and CLK output of the digital readout circuit 203 to the tip contact 201*a* and the ring contact 201*b* of the connector 201, for example controlling the two switches (SW1, SW2) in their positions 1, as depicted in FIG. 2. Then, the digital readout circuit 203 sends an active voltage VDD and a clock signal CLK to the microphone plugged into the connector 201 through the tip and ring contacts 201*a* and 201*b* of the connector 201. The detection unit 204*a* detects that the microphone plugged into the connector is the digital microphone when a data signal from the microphone plugged into the connector 201 at the second sleeve contact 201*d* can be received by the readout circuit 203. Otherwise the detection circuit 204*a* detects that the microphone plugged into the connector is analog and alternately controls the switching unit 204*b* to connect the analog readout circuit 202 to the connector 201, that is, the switching unit 204*b* connects the tip and ring contacts 201*a* and 201*b* of the connector 201 to the analog readout circuit 202 to process the analog audio signal from the analog microphone. Therefore, right-channel bias R_bias and left-channel bias L_bias are provided to the connector 201 such that the right-channel and left channel audio signals from the analog microphone are valid and input to audio inputs (AIN_R and AIN_L) of the analog readout circuit 202.

The detection unit 204*a* may comprise a microcontroller and a GPIO (general purpose input/output) device, both not shown in FIG. 2. The microcontroller controls the GPIO device to instruct the switching unit 204*b* to normally connect the digital readout circuit 203 to the connector 201. For example, the microcontroller may monitor signal reception of the digital readout circuit 203 to control the switching unit 204*b*, and the GPIO device outputs a GPIO signal with a predetermined logic level serving as the instruction.

If the analog microphone, with only one sleeve portion 11*c* as depicted in FIG. 1A, is plugged into the connector 201, the first sleeve contact 201*c* and second sleeve contact 201*d* are shorted to the ground reference by the sleeve portion 11*c*. Therefore, the detection unit 204*a* also can detect the microphone plugged into the connector 201 as the analog microphone when voltage levels at the first and second sleeve contacts 201*c* and 201*d* equal to the reference ground.

Also, the decision circuit can detect the type of the microphone plugged into the connector by directly identifying the number of sleeves configured on a plug of the microphone.

The electronic system 20 further comprises an audio processing unit 220 to process the analog audio signal output by the analog readout circuit 202 or the digital audio signal output by the digital readout circuit 203. The audio processing unit 220 may comprise an audio codec to process the analog audio signal, and a conversion device to convert format of the digital audio signal for further processing.

Figure 3:
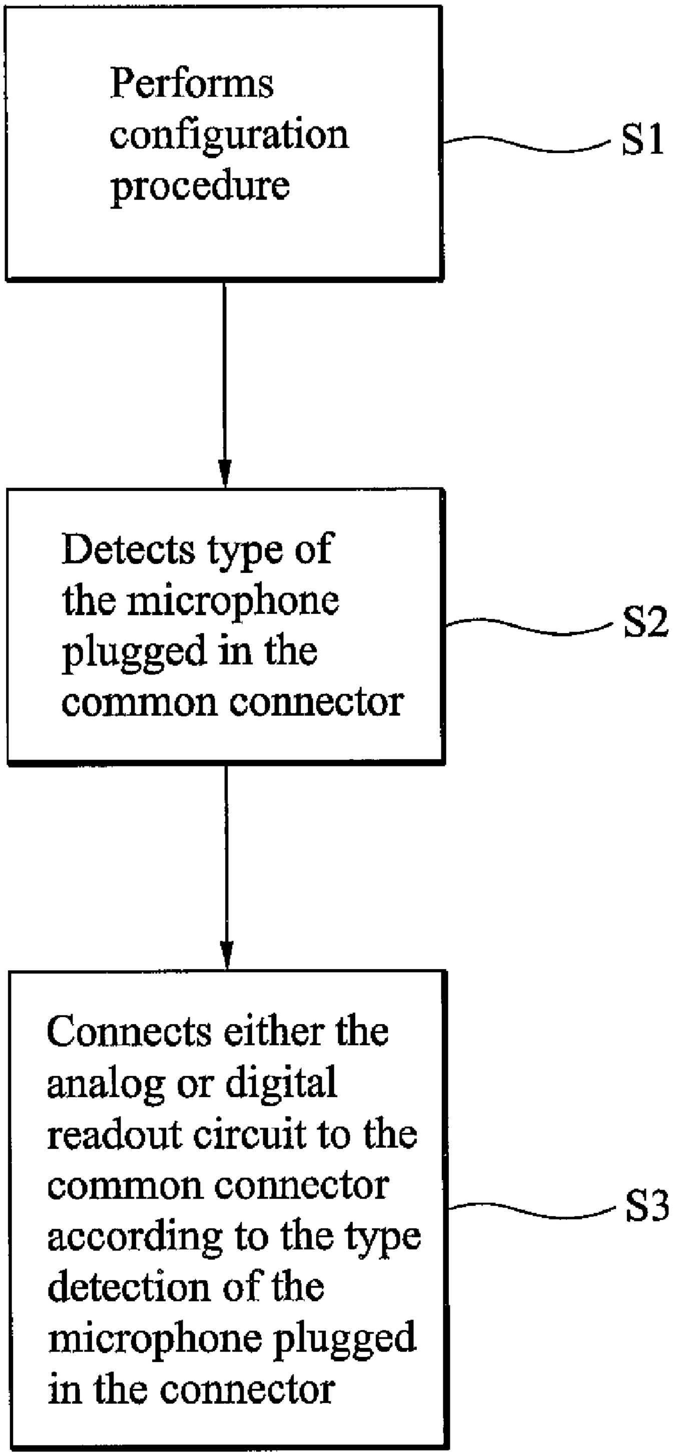
FIG. 3 is a flowchart of an audio interface method according to the invention.

FIG. 3 is a flowchart describing an audio interface method corresponding to the operation of the above audio interface. According to the audio interface method, a configuration procedure is first performed to provide a common connector to electrically connect with a microphone plugged therein, a digital readout circuit to acquire a digital audio signal from a digital microphone, and an analog readout circuit to acquire an analog audio signal from an analog microphone (step S1). Then, the microphone type plugged into the common connector (step S2) is detected and either the analog or digital readout circuit is connected to the common connector to acquire either the analog or digital audio signal according to the microphone type (step S3). The digital or analog signal from the digital or analog microphone can thus be acquired through the common connector.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio interface, comprising:

a connector, electrically connected with a microphone plugged thereinto;

an analog readout circuit, acquiring an analog audio signal from an analog microphone;

a digital readout circuit, acquiring a digital audio signal from a digital microphone; and a decision circuit, selectively connecting the analog or digital readout circuit to the connector to acquire the analog or digital audio signal respectively according to whether the microphone plugged into the connector is analog or digital;

wherein the decision circuit comprises:

a detection unit, detecting a type of the microphone plugged into the connector; and a switching unit, connecting either the analog readout circuit or the digital readout circuit to the connector according to detection of the detection unit;

wherein the connector is an audio jack connector with a tip contact, a ring contact, first and second sleeve contacts, corresponding to a plug configuration of the digital microphone; wherein one of the first and second sleeve contacts is connected to a reference ground, and the other receives the digital audio signal from the digital microphone plugged into the connector; and wherein the detection unit controls the switching unit to connect the digital readout circuit to the connector such that the digital readout circuit sends an active voltage and a clock signal to the microphone plugged into the connector through the tip and ring contacts of the connector, whereby the detection unit detects that the microphone plugged into the connector is the digital microphone when receiving a data signal from the microphone plugged into the connector at the first or second sleeve contact not connected to the reference ground, otherwise detects the microphone plugged into the connector is analog and alternately controls the switching unit to connect the analog readout circuit to the connector.

2. The audio interface as claimed in claim 1, wherein the detection unit detects the microphone plugged into the connector as the analog microphone when voltage levels at the first and second sleeve contacts equal the reference ground.

3. The audio interface as claimed in claim 1, wherein the switching unit connects the tip and ring contacts of the connector to the analog readout circuit to process the analog audio signal from the analog microphone, when the detection unit detects the microphone is analog.

4. The audio interface as claimed in claim 1, wherein the decision circuit detects the type of the microphone plugged into the connector by identifying the number of sleeves configured on a plug of the microphone.

5. An electronic system with the audio interface as claimed in claim 1, capable of acquiring the digital or analog audio signal from the digital or analog microphone through a common audio port implemented only by the connector provided on the audio interface.

6. The electronic system as claimed in claim 5, wherein the connector is an audio jack connector with a tip contact, a ring contact, first and second sleeve contacts, corresponding to a plug configuration of the digital microphone; wherein one of the first and second sleeve contacts is connected to a reference ground, and the other receives the digital audio signal from the digital microphone plugged into the connector.

7. The electronic system as claimed in claim 6, further comprising an audio processing unit to process the analog audio signal output by the analog readout circuit or the digital audio signal output by the digital readout circuit.

8. An audio interface method, comprising:

providing a common connector to electrically connect with a microphone plugged thereinto;

providing a digital readout circuit to acquire a digital audio signal from a digital microphone;

providing an analog readout circuit to acquire an analog audio signal from an analog microphone;

detecting the type of the microphone plugged into the common connector; and connecting either the analog or digital readout circuit to the common connector to acquire either the analog or digital audio signal according to the detected type of the microphone plugged into the connector, wherein the common connector is an audio jack connector with a tip contact, a ring contact, first and second sleeve contacts, corresponding to a plug configuration of the digital microphone; wherein one of the first and second sleeve contacts is connected to a reference ground, and the other receives the digital audio signal from the digital microphone plugged into the common connector; and connecting the digital readout circuit to the common connector such that the digital readout circuit sends an active voltage and a clock signal to the microphone plugged into the connector through the tip and ring contacts of the common connector, whereby it is detected that the microphone plugged into the common connector is the digital microphone when receiving a data signal from the microphone plugged into the common connector at the first or second sleeve contact not connected to the reference ground, otherwise that the microphone plugged into the connector is analog and alternately controls the switching unit to connect the analog readout circuit to the common connector whereby the digital or analog signal from the digital or analog microphone can be acquired through the common connector.

* * * * *